United States Patent [19]

Stankus

[11] 3,865,985

[45] Feb. 11, 1975

[54] TELEPHONE CONTROL SYSTEM HAVING WAKEUP, MESSAGE WAITING, SPECIAL MESSAGE AND FIRE ALERT MODES

[75] Inventor: Robert W. Stankus, Fairfield, Conn.

[73] Assignee: Letot, Incorporated, Fairfield, Conn.

[22] Filed: Sept. 7, 1973

[21] Appl. No.: 395,186

[52] U.S. Cl. .................................. 179/5 P, 179/2 A
[51] Int. Cl. ........................................... H04m 11/04
[58] Field of Search ............ 179/2 A, 2 R, 5 P, 5 R

[56] References Cited

UNITED STATES PATENTS

| | | | |
|---|---|---|---|
| 3,519,749 | 7/1970 | Kline | 179/5 R |
| 3,643,029 | 2/1972 | Breazeale | 179/5 R |

*Primary Examiner*—Ralph D. Blakeslee
*Attorney, Agent, or Firm*—Pennie & Edmonds

[57] ABSTRACT

A telephone control system for use with a telephone which is connected to a telephone substation and where the system has a plurality of audio message transmitting means and a plurality of calling signal means and including a telephone actuation means whereby a telephone may be disconnected from the substation and connected to one of the plurality of calling system means and audio communication means.

A fire alert system for disconnecting a telephone from a substation or other audio message transmitting means regardless of whether the telephone is in use and connecting the telephone to an emergency audio transmission means.

10 Claims, 4 Drawing Figures

TELEPHONE CONTROL SYSTEM HAVING WAKEUP, MESSAGE WAITING, SPECIAL MESSAGE AND FIRE ALERT MODES

DESCRIPTION OF THE PRIOR ART

Telephone systems for use in motels, hotels and the like are known which include means for indicating that the room occupant should contact the operator or other person for a message. Some systems incorporate the use of a flashing light which may be mounted on a pedestal and which requires special wiring extending from the message center to each room. Other systems have a flashing light associated with each telephone and may utilize existing telephone wires extending from a message center to each individual telephone. Telephone systems are also known which incorporate wakeup systems by which a signal is sent from a central message area, such as a telephone switchboard, to each individual telephone to ring the same at a predetermined time to provide a wakeup signal and audio message for a guest. Both the wakeup systems and message waiting systems utilizing existing telephone wires are usually limited to perform one function that is they either provide wakeup information or provide message waiting information.

It is an object of my invention to provide a telephone control system which uses existing telephone wires and by which a plurality of different messages may be transmitted to each telephone, for example wakeup messages, message waiting information, or special program messages. It is a further object to provide a fire alert control system through which a recorded emergency message may be transmitted to each individual telephone and which may override or cut in on any previous messages that are being transmitted either from an audio transmission means or from a substation when the telephone is in normal use.

GENERAL DESCRIPTION OF THE INVENTION

In many telephone installations, particularly hotel or motel installations, there is a need that certain type of information be available for transmission to individual telephones during particular parts of a day. For example, during the morning it is desirous that wakeup information be transmitted to individual rooms. In other parts of the day, for example the afternoon and evenings the information that need be sent to individual rooms usually relates to waiting messages. Also, it is often desirable that special messages be sent to individual rooms or groups of rooms relating to convention or other special meeting notices. At other times it is necessary, such as during a fire alert situation, that emergency messages be transmitted to individual rooms or groups of rooms to give evacuation or other vitual information.

Broadly my invention recognizes that different messages are desired to be sent at different times of the day such that a group of telephones may be connected to a particular audio communication means during one time of the day and to other audio communication means during other parts of the day, as for example, to a wakeup audio communication means during the morning hours or a message waiting or special message audio communication means during the afternoon or evening hours.

The invention contemplates generally a telephone message control system which is used with at least one telephone which is adapted to be connected to a conventional telephone substation by telephone wires through an individual calling unit associated with each telephone. The telephone utilized is conventional and has a manually operated switch which when the receiver is raised is adapted to connect the telephone for audio communication to the substation and which when the receiver is down is adapted to connect the telephone to a calling signal means. The message control system has a first calling signal means for supplying pulsating power at a first preset frequency in order to ring the bell of a telephone at a predetermined loudness and at predetermined intervals. This would include the normal ringing generator which usually operates on the order of 20 cycles and has a ringing sequence one second on and three seconds off. A first audio communication means is provided which plays a recorded tape giving wakeup information, namely time of the day. A wakeup actuation means is provided by which the calling signal means and audio communication means are connected to each calling unit. A telephone actuation means is provided for each individual telephone by which the telephone wires associated with a single telephone may be disconnected from the telephone substation and connected to the first calling signal means and to the first audio communication means. Circuitry is included so that when the room occupant answers the telephone in response to a signal imparted by the calling signal means, the manually operated switch will complete a circuit to disconnect the calling signal means from the telephone wires and connect the audio communication means to the wires in order that the message on the tape may be transmitted to the occupant. Preferably, indicating means are provided at a station which includes the telephone actuation means which will indicate when a calling signal is sent to a particular telephone and when that telephone is in audio communication with the audio communication means.

A second calling signal means including a second ringing generator is provided for supplying pulsating power at a second preset frequency and at different intervals than the first ringing generator to cause the bell of the telephone to ring with a different signal to indicate a further condition, for example a message waiting signal. The operating frequency of the second generator may be lower than that of the first generator so that the ringing signal will be more subdued than with the normal or wakeup ring. The interval between ringing signals may also be varied, i.e., to provide two pulses to the bell followed by thirty seconds of quiet. A second audio communication means containing a desired message, for example to call the message desk for a message, is included in the system as well as a message waiting actuation means for selectively connecting the second calling signal means and audio communication means to the calling unit.

A still further message audio communication means may be provided which is selectively connected to the calling unit by actuation of a special message actuation means and which also disconnects the wakeup and message waiting audio communication means from the calling unit. In such instance preferably the second ringing generator is utilized.

The invention also contemplates a fire alert feature comprising an emergency audio communication means and key operated actuation means for connecting the emergency audio communication means to each calling unit.

At the same time the wakeup, message waiting and special message audio communication means are disconnected from the calling unit as well as the telephone wires from the substation regardless of whether the telephone is in use. In this instance the normal or first ringing generator is used.

DETAILED DESCRIPTION OF THE PREFERRED EMBODIMENTS

Figure 1:
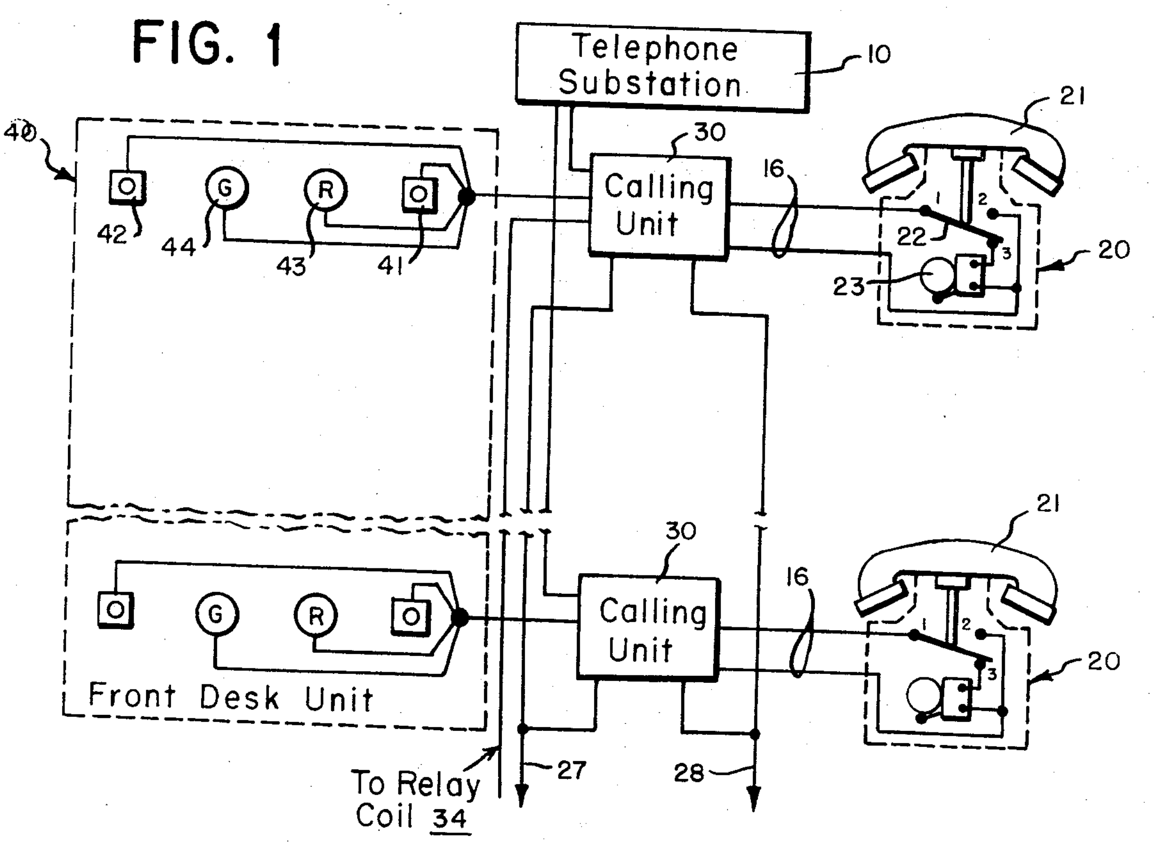
FIG. 1 is a diagrammatical circuit diagram illustrating a plurality of telephones, each connected with a calling unit, substation and front desk unit.

Referring to FIG. 1, there is illustrated a telephone system comprising a conventional telephone substation 10, a plurality of telephones 20, a calling unit 30 and a front desk unit 40. Each telephone comprises a receiver 21 which operates a manual switch 22 such that when the receiver is mounted on its cradle, the switch 22 connects with a ringing solonoid 23 through contacts 1–3 of switch 22. Each telephone is connected to its calling unit by wires 16 and to the substation by wires 17.

The front desk unit 40 includes a plurality of telephone actuation means or buttons 41, which as explained later, when actuated disconnect the wires 16 of individual telephones from the substation. A plurality of cancelling actuation means 42 are also included which when actuated reconnect individual telephones to the telephone substation. Red bulbs 43 serve to provide a visual indication of when the actuating means 41 are actuated while green bulbs 44 serve to provide a visual indication when individual telephone receivers 21 have been lifted from their cradles and thus indicate that a telephone user is receiving a recorded message.

Figure 2:
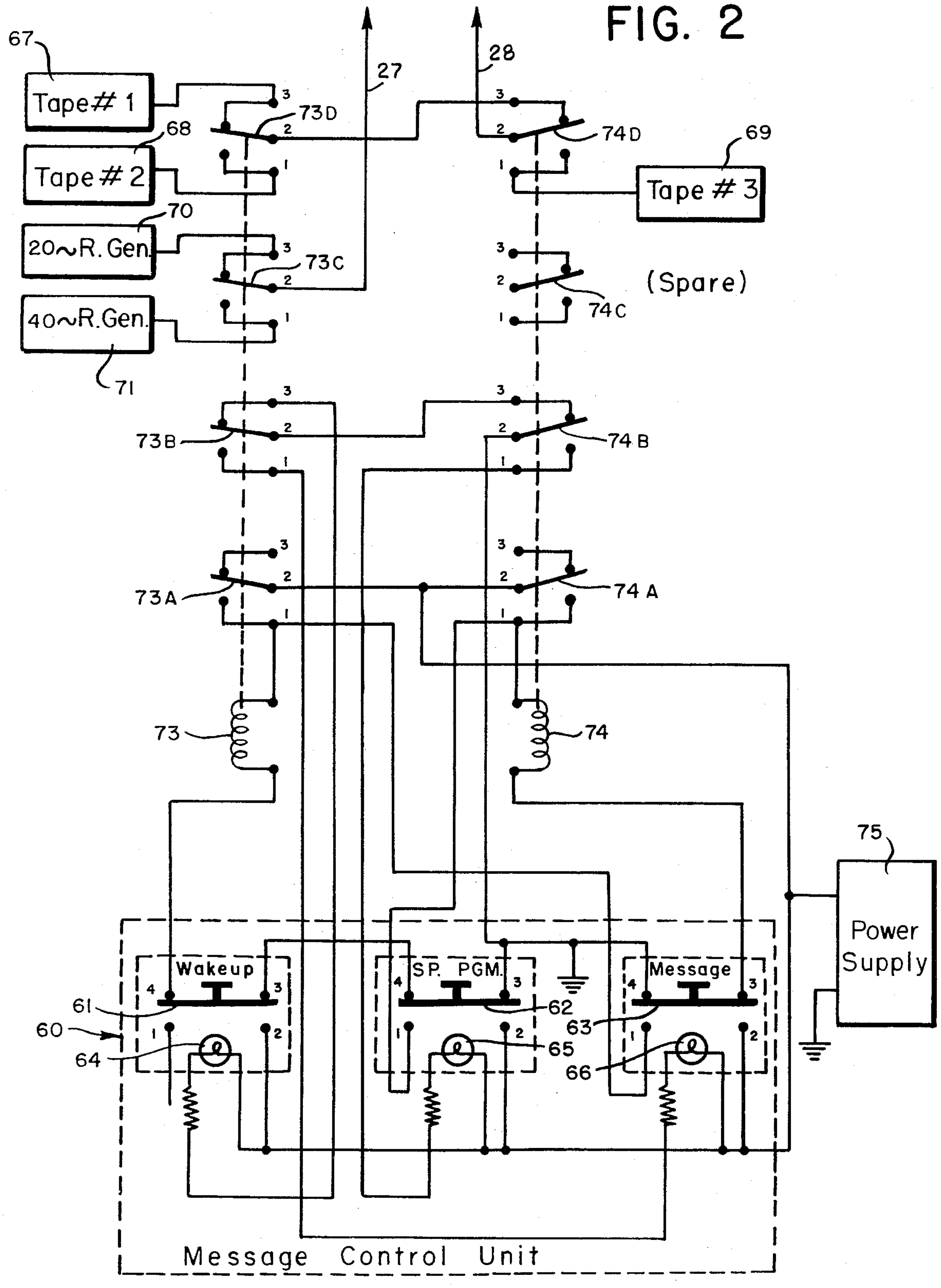
FIG. 2 is a circuit diagram illustrating a message control circuit according to the invention by which a plurality of audio messages may be connected to the calling units of FIG. 1.

Referring to FIG. 2, there is illustrated a message control circuit including a plurality of ringing generators as well as audio communication tape player means to provide a plurality of recorded messages to a telephone user. The system includes a message control unit 60 which may be mounted near to the front desk unit 40 and which includes a wakeup actuation means 61, a special message actuation means 62, and a message waiting actuation means 63, each comprising a depressible switch for activating wakeup, special message or message waiting modes of the circuit. A wakeup bulb 64 is associated with the wakeup switch 61 to provide a visual indication of when the wakeup mode is activated. Similarly, a special message bulb 65 and a message waiting bulb 66 provide visual indicating means of when the special message and message waiting modes are activated. A first audio communication means 67 comprising a tape player containing tape 1 to impart a wakeup message is included in the system. The message may contain such information as, for example, "Good morning. The time is now — —." A tape player 68 containing tape 2 would contain a special message, for example, a message that is to be sent to members of a convention or other special group concerning a particular meeting. Tape player 69 includes tape 3 which is utilized to impart information to a room occupant that he should call a message center to receive a waiting message.

The system includes a conventional ringing generator 70 which operates at 20 cycles and is programmed to send a ringing pulse to the solonoids 23 of the telephones at intervals of one pulse followed by a three-second rest. A second ringing generator 71 which operates at a frequency of 40 cycles provides a subdued ringing signal different from that of ringing generator 70, for example two pulses followed by a thirty-second rest. All of the tape players and the ringing generators are self-contained, having their own power sources, and may operate continuously.

The control circuit includes a relay coil 73 for operating switches 73A–D in a manner hereafter described. Also included is a separate relay coil 74 which operates switches 74A–D. The circuit is connected to a power supply 75 and is joined by leads 27 and 28 to leads 27A and 28A which in turn connect with the individual calling units such that the various tape players and ringing generators may be selectively connected to the calling units and then selectively connected by means of the switch 41 to individual telephones.

Figure 3:
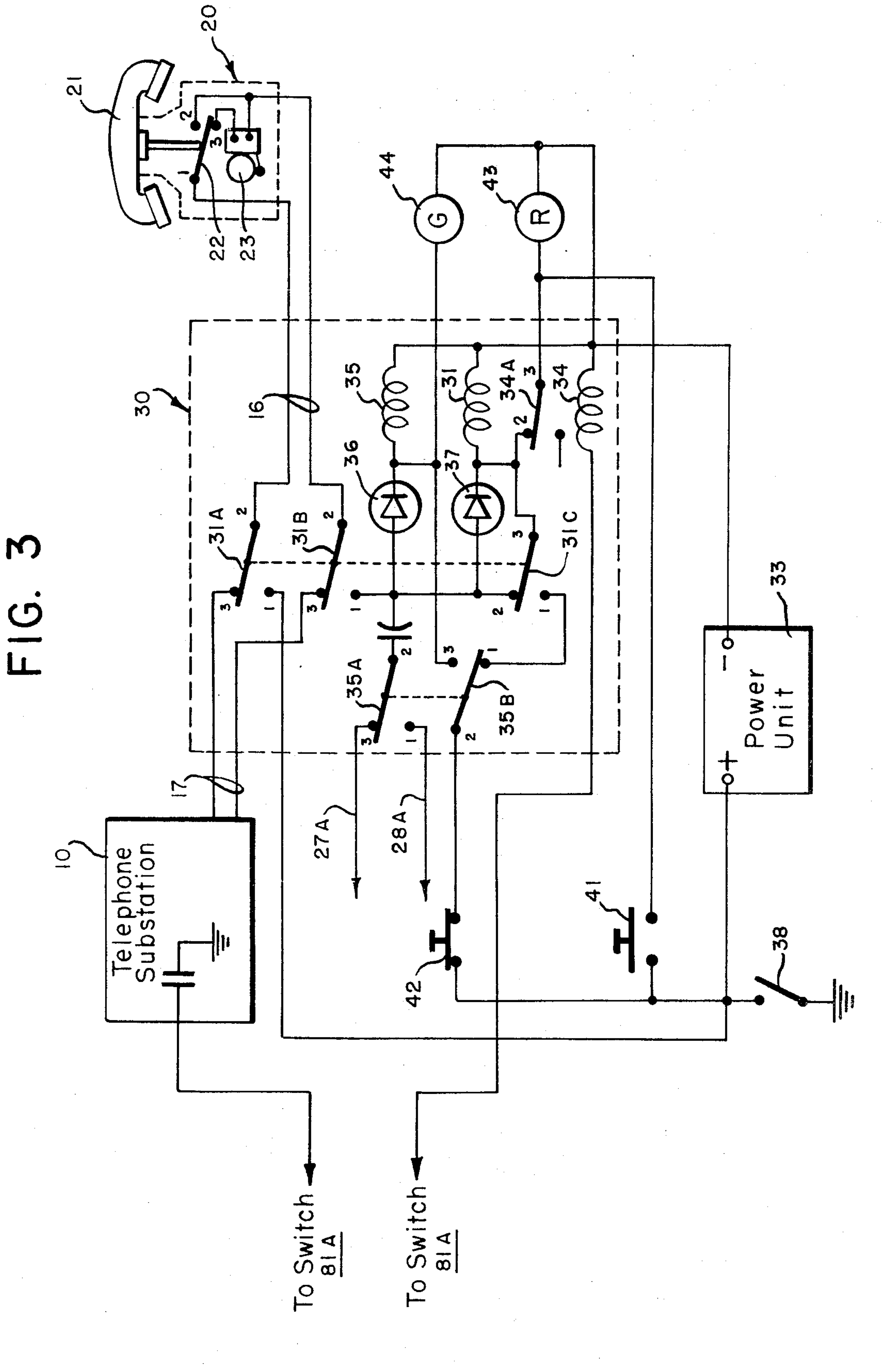
FIG. 3 illustrates diagrammatically the circuitry associated with an indivdual telephone by which the telephone may be selectively disconnected from a telephone substation and connected to calling signal and audio communication means.

Reference is now made to FIG. 3 which illustrates the circuitry by which indivudal telephones are selectively disconnected from a telephone substation and connected to leads 27 and 28 via leads 27A and 28A which in turn connect with the ringing generators and tape players. As shown each of the telephone wires 16 connects by way of solonoid operated switches 31A and 31B to wires 17 leading to the substation. Switches 31A and B are moved by relay coil 31 which is shown contained in a circuit including a power unit 33, the switches 41 and 42 as well as the bulbs 43 and 44. The circuit also includes a busy control relay coil 34 which is energized when the telephone is in audio communication with the telephone substation to open switch 34A. When switch 34A is opened, relay coil 31 cannot be energized thus preventing movement of switches 31A and B to disconnect the telephone from the substation. A relay coil 35 is included in the system and is adapted to be energized when the telephone receiver 21 is lifted from its cradle and so closing the switch 22. Energization of coil 35 will then move switches 35A and B to disconnect the ringing generator from the telephone and connect the audio message means thereto. Diodes 36 and 37 are included in the circuit to control the direction of current therethrough.

Figure 4:
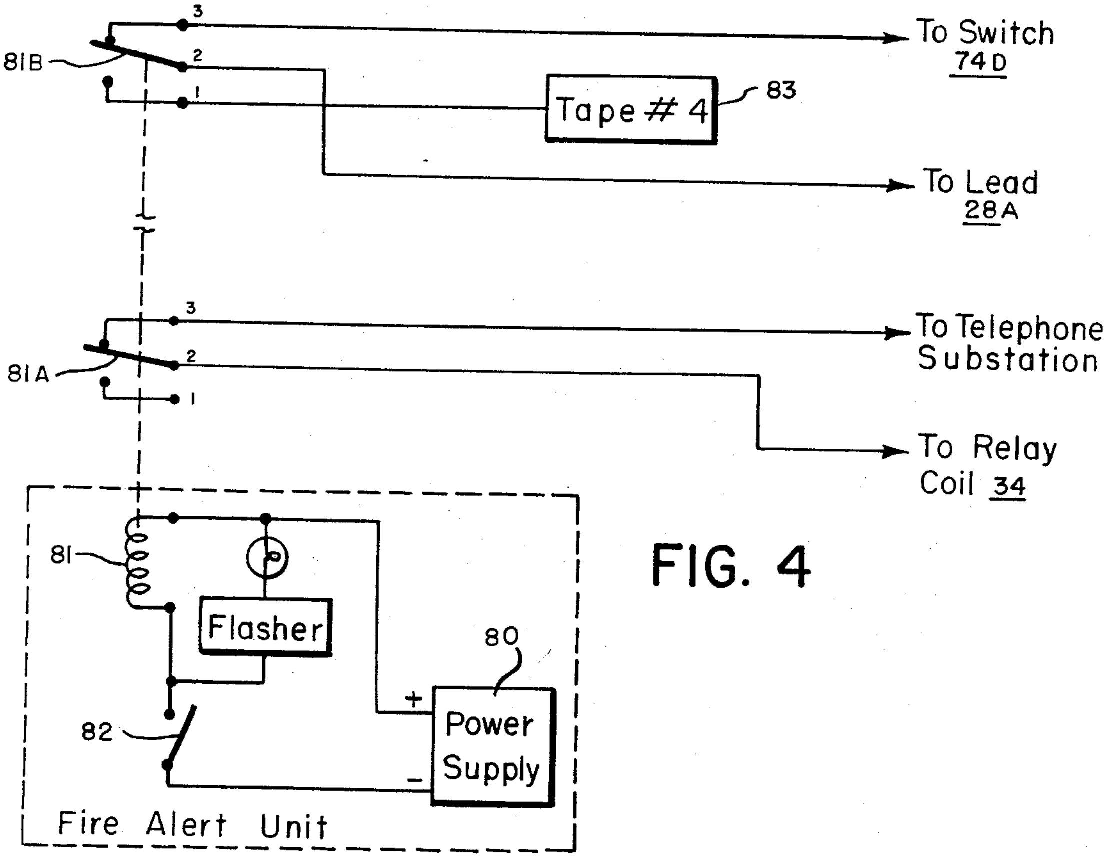
FIG. 4 is a circuit diagram of a fire alert control system according to the invention by which an emergency audio message means may be connected to the circuits of FIGS. 2 and 3 to provide a fire alert message.

Referring to FIG. 4 there is illustrated circuitry including the fire alert system which is utilized to connect telephones to a fourth tape player including an emergency message. As shown the circuit includes a self-contained power supply unit 80, a relay coil 81 and a key operated switch 82 which may be used to complete a circuit. Completion of the circuit will energize coil 81 to move switches 81A and B. Switch 81A is connected to a circuit including the busy control coil 34 while switch 81B is contained in the circuit connecting a tape player 83 to contact 2 of switch 74D.

OPERATION OF THE TELEPHONE ACTUATION MEANS FOR SELECTIVELY DISCONNECTING A TELEPHONE FROM A SUBSTATION

Referring to FIG. 3, when it is desired to disconnect a particuclar telephone from a substation and to connect it to a ringing generator, the telephone actuation means 41 comprising a push-button switch is pressed down. This will then complete a circuit between the power unit 33, through switch 41, contacts 2–3 of switch 34A, relay 31 back to the power unit. Energization of relay 31 in turn will cause switches 31A and B to move and close the contacts between contacts 1–2 thereof disconnecting the telephone wires 16 from wires 17 leading to the substation 10. A circuit will at the same time be completed from the power unit through switch 42, contacts 2–1 of switch 35B, contacts 1–3 of switch 31C, through coil 31 back to the power unit to thus provide a locking circuit to keep the coil 31 energized. At the same time a circuit is completed by contacts 3–2 of switch 34A, through the red bulb 43 back to the power unit thus illuminating the bulb to indicate that the telephone wires are in communication with a ringing generator.

The ringing generator will impart a pulse through lead 27 and 27A, contacts 3–2 of switch 35A, contacts 1–2 of switch 31B, the telephone ringing solonoid 23, contacts 3–1 of switch 22, contacts 2–1 of switch 31A and back to ground 38. The guest, upon answering the telephone, lifts the receiver 21 which will then close switch 22. A circuit is then completed from the power unit through contacts 1–2 of switch 31A, contacts 1–2 of switch 22, contacts 2–1 of switch 31B, through diode 36, through relay coil 35 back to the power unit. At the same time current will flow through diode 37, contacts 3–2 of switch 34A through the red bulb and back to the power unit. Energization of coil 35 will cause switch 35A to move to connect the leads 28 and 28A extending to the audio communication means to the telephone wires. At the same time a circuit is completed from the power unit, switch 42, contacts 2–3 of switch 35B, through the green bulb 44 to illuminate the same and back to the power unit. Illumination of both the green and red bulbs indicates that the telephone receiver is off its cradle and in communication with the audio communication means. Coil 31 is maintained energized by a circuit including diode 37.

Upon receipt of the message, the guest replaces the receiver on its cradle thus breaking the contact between contacts 1–2 of switch 22. This will deenergize coil 31 thus allowing switches 31A and B to return to their full line position to reconnect the telephone to the substation. At the same time the energizing path through diode 37 is broken thus extinguishing the red bulb. However coil 35 remains energized through a circuit through switch 42, contacts 2–3 of switch 35B, coil 35 back to the power unit. The circuit containing the green bulb 43 remains energized and thus the green light provides proof that the guest has received the message. At some later time, as when the guest checks out, the cancelling means 42 may be activated to break the circuit including the coil 35 thus returning switches 35A and B to their full line positions and extinguishing the green bulb.

In the event that the telephone is in use, a circuit is completed between the substation, coil 34 and the power unit. Energization of coil 34 will open switch 34A. In such instances, when the telephone actuation means 41 is depressed, no circuit will be completed including coil 31 thus switches 31A and B remain in their full line positions keeping the telephone connected to the substation and preventing a call from being interrupted.

OPERATION OF THE MESSAGE CONTROL SYSTEM

The message control system illustrated in FIG. 2 is shown in the normal wakeup mode of operation. Tape player 67 having a tape 1 containing a wakeup message is connected by contacts 3–2 of switch 73D and contacts 3–2 of switch 74D to lead 28 which connects with lead 28A and the calling units. A conventional ringing generator 71 is connected by contacts 3–2 of switch 73C to lead 27 which connects with lead 27A and the calling units. A wakeup indicating bulb 64 is illuminated by a circuit extending between the power supply, the bulb 64, contacts 3–2 of switch 73B, contacts 3–2 of switch 74B back to ground to give a visual indication that the system is in the wakeup mode.

When it is desired to change the system over to a message waiting mode, as would normally occur during afternoon or evening hours, the message waiting actuation means 63 is depressed. This will create a circuit between the power supply, contacts 1–2 of the message actuation switch, coil 73, contacts 4–3 of switch 71, contacts 4–3 of switches 61 and 62 and back to ground. Energization of coil 73 will more switches 73A–D. This in turn will create a locking circuit for relay coil 73 through contacts 2–1 of switch 73A, through the coil 73 and back to ground through switches 61 and 62. Switch 73D will be moved to disconnect tape player 67 from lead 28 and connect tape player 68 containing tape 2 to this lead. At the same time switch 73C will be moved to disconnect the ringing generator 70 from the system and connect ringing generator 71 to lead 27. A circuit is formed at the same time between the power supply, the message waiting bulb 66, contacts 1–2 of switch 73B, contacts 3–2 of switch 74B back to ground to illuminate the bulb and provide a visual indication that the system is in the message waiting mode.

If the special program mode is to be activated, the special program actuation means 62 is depressed. This will create a circuit between the power supply, contacts 2–1 of switch 62, relay coil 74, contacts 3–4 of switch 63 back to ground. Energization of coil 74 will move switches 74A–D. Movement of switch 74A will create a locking circuit for coil 74 from the power supply through contacts 2-1 of switch 74A, contacts 3–4 of switch 63 and back to ground. Switch 74D will disconnect either tape players 67 or 68 from the lead 28 and connect tape player 69 containing tape 3, a special programming tape, to the lead 28 and thus to calling units. At the same time special message indicating means 65 will be illuminated by a circuit extending from the power supply through bulb 65, contacts 1–2 of switch 74B and back to ground. The ringing generator utilized in this mode of the operation is the conventional generator 70.

When it is desired to change the system back to the normal wakeup mode, the wakeup actuation means 61 is depressed. This will deenergize relay coil 73 allowing the switches 73A–D to return in the position shown in full line in the drawing, allowing tape player 67 to be connected to the lead 28 and the ringing generator 70 to be connected to lead 27.

OPERATION OF THE FIRE ALERT SYSTEM

Referring to FIG. 4 there is illustrated a fire alert system which may be incorporated with the message control systems illustrated in FIG. 2 as well as with the selective telephone actuation means as illustrated in FIG. 3. Upon receipt of a fire warning, the operator may actuate the fire alert system by actuation of the key operated switch 82. Normally keys would only be issued to responsible personnel in order to eliminate inadvertent actuation of the system. Closing of switch 82 energizes relay coil 81 while at the same time illuminating the bulb to show that the system is in operation. A flasher preferably would be utilized to make operation of the system more visually apparent. Energization of coil 81 will actuate switches 81A and B. Switch 81A controls a circuit extending between the substation 10 and the busy control relay coil 34 associated with each telephone. As shown, switch 81A in its normal position when coil 81 is deenergized, keeps the coil 34 connected to the substation by way of contacts 3–2. Upon activation of the fire alert system, coil 34 would be disconnected from the substation such that it could not be energized to move the switch 34A and thus prevent disconnection of the telephone wires 16 from the substation. At the same time switch 81B is moved to connect the tape player 83 containing an evacuation tape 4 to lead 28A by way of contacts 1–2 of switch 81B. The contact 3 of switch 81B extends to contact 2 of switch 74D.

An advantage of utilizing the fire alert system of the invention in combination with the telephone actuation means by which individual telephones may be selectively connected to an audio communication means is that a warning may be sent to only those rooms which must necessarily be evacuated and thus prevent undue congestion at elevators, stairwells, etc. By utilizing a system of selective telephone actuation, evacuation may be in an orderly fashion either by way of particular floors or by way of wings of a building.

While the fire alert system is shown as applied to a message control system having three separate message communication means, it is obvious that the fire alert system would be applicable for use with a message system having one or more audio communication means.

I claim:

1. A telephone message control system for use with at least one telephone connected to a telephone substation by telephone wires by way of a calling unit associated with each telephone and where each telephone has a manually operated switch which in one position is adapted to connect the telephone for audio communication and in a second position to connect the telephone to a calling signal means, said control system comprising:

a. A first calling signal means for supplying a first pulsating calling signal, b. A first audio communication means for providing a first audio message, c. A second calling signal means for supplying a second pulsating calling signal, d. A second audio communication means for providing a second audio message, e. A first message actuation means, f. A second message actuation means, g. A message control circuit including:

i. means for connecting said first calling signal means and said first audio transmission means to each said calling unit and disconnecting said second calling means and said second audio transmission means from each said calling unit when said first message actuation means is actuated, and ii. means for connecting said second calling signal means and said second audio transmission means to each said calling unit and disconnecting said first calling signal means and said first audio transmission means from each said calling unit when said second actuation means is actuated, and h. Telephone acutation means associated with each said telephone for selectively disconnecting the telephone wires from said substation and connecting said wires to a calling signal means and audio transmission means connected to the associated calling unit by the message control circuit.

2. A telephone message control system according to claim 1 wherein said message control circuit includes in addition message indicating means for indicating when each of said message actuation means is actuated.

3. A telephone message control system according to claim 2 having in addition first indicating means associated with each telephone to indicate when the telephone actuation means associated with each telephone has been actuated.

4. A telephone message control system according to claim 3 having in addition a second indicating means associated with each telephone to indicate when the telephone is in audio communication with an audio communication means.

5. A telephone message control system according to claim 1 having in addition busy control means associated with each telephone for preventing the telephone actuation means from disconnecting the telephone wires from the substation when the telephone is in audio communication with the substation.

6. A telephone message control system according to claim 5 having in addition a fire alert system comprising:

i. A further audio communication means containing a fire alert message, j. A fire alert actuation means, and k. A fire alert circuit including a busy control override means for overriding each said busy control means to connect said further audio communication means to each said calling unit and for disconnecting said first and second audio communication means from each said calling unit and the telephone lines associated with each telephone from said substation when said fire alert actuation means is actuated.

7. A telephone message control system according to claim 1 wherein said first calling signal means supplies power at a first frequency and said second calling signal means supplies power at a second frequency whereby the loudness of the first and second calling signals is different.

8. A telephone message control system according to claim 1 wherein the first signal calling means produces a first pulsating signal having a different period of pulses than the second pulsating signal.

9. A telephone message control means according to claim 1 having in addition:

i. A third audio communication means for providing a third audio message, j. A third message actuation means, and wherein said message control circuit includes in addition means for connecting one of the first or second calling signal means to each calling unit and said third audio communication means to each said calling unit when said third message actuation means is actuated.

10. An emergency alert system for use with a telephone system having a substation, at least one telephone connected by telephone wires to said substation, at least one audio message communication means, and means for selectively disconnecting said telephone wires from said substation and connecting them to said audio message communication means; said alert system comprising an alert audio communication means, an alert actuation means, and alert circuit means including means for disconnecting said telephone wires from said substation and for connecting them to said alert communication means and for disconnecting said telephone wires from said audio message communication means when said telephone wires and connected to said audio message communication means and for connecting them to said alert communication means when said alert actuation means is actuated.

* * * * *

UNITED STATES PATENT AND TRADEMARK OFFICE

CERTIFICATE OF CORRECTION

PATENT NO. : 3,865,985

DATED : February 11, 1975

INVENTOR(S) : Robert W. Stankus

It is certified that error appears in the above-identified patent and that said Letters Patent are hereby corrected as shown below:

Claim 1, line 22, change "transmission" to --communication--;
line 24, delete "trans-";
line 25, change "mission" to --communication--;
line 29, change "transmission" to --communication--;
line 32, change "transmission" to --communication--;
line 39, change "transmission" to --communication--;

Signed and Sealed this

*twenty-ninth* Day of *June 1976*

[SEAL]

*Attest:*

RUTH C. MASON
*Attesting Officer*

C. MARSHALL DANN
*Commissioner of Patents and Trademarks*